United States Patent

Vaglica

(10) Patent No.: US 7,539,878 B2
(45) Date of Patent: May 26, 2009

(54) CPU POWERDOWN METHOD AND APPARATUS THEREFOR

(75) Inventor: John Vaglica, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 915 days.

(21) Appl. No.: 09/956,300

(22) Filed: Sep. 19, 2001

(65) Prior Publication Data

US 2003/0056127 A1 Mar. 20, 2003

(51) Int. Cl.
*G06F 1/32* (2006.01)

(52) U.S. Cl. ........................................ 713/300
(58) Field of Classification Search .................. 713/300
See application file for complete search history.

(56) References Cited

U.S. PATENT DOCUMENTS

| | | | | |
|---|---|---|---|---|
| 5,167,024 A | * | 11/1992 | Smith et al. ................. | 713/322 |
| 5,283,792 A | | 2/1994 | Davies, Jr. | |
| 5,689,714 A | * | 11/1997 | Moyer ........................ | 713/310 |
| 5,889,968 A | * | 3/1999 | Bennett et al. .............. | 710/112 |
| 6,014,751 A | * | 1/2000 | Kardach et al. ............. | 713/324 |
| 6,128,747 A | * | 10/2000 | Thoulon ...................... | 713/330 |
| 6,157,979 A | | 12/2000 | Barnett | |
| 6,209,088 B1 | | 3/2001 | Reneris | |
| 6,449,683 B1 | * | 9/2002 | Silvester ..................... | 711/103 |
| 6,546,472 B2 | * | 4/2003 | Atkinson et al. ............ | 711/156 |
| 6,694,443 B1 | * | 2/2004 | Maher et al. ................ | 713/323 |

FOREIGN PATENT DOCUMENTS

WO WO 93/20498 10/1993
WO WO 01/27728 A1 4/2001

* cited by examiner

*Primary Examiner*—Thomas Lee
*Assistant Examiner*—Eric Chang
(74) *Attorney, Agent, or Firm*—James L. Clingan, Jr.; Daniel D. Hill

(57) ABSTRACT

A CPU has a powerdown mode in which most of the circuitry does not receive power. Power-up, coming out of powerdown, is achieved in response to receiving an exception. Because most of the state information that is present in the CPU is not needed in response to an exception, there is no problem in removing power to most of the CPU during powerdown. The programmer's model register file and a few other circuits in the CPU are maintained in powerdown, but the vast majority of the circuits that make up the CPU: the execution unit, the instruction decode and control logic, instruction pipeline and bus interface, do not need to receive power. Removing power from these non-critical circuits results in significant power savings during powerdown. The powered circuits are provided with a reduced power supply voltage to provide additional power savings.

20 Claims, 2 Drawing Sheets

CPU POWERDOWN METHOD AND APPARATUS THEREFOR

BACKGROUND OF THE INVENTION

1. Field of the Invention

The field of the invention is central processing units (CPUs) and more particularly to powerdown of such CPUs.

2. Related Art

One of the important features of integrated circuits deigned for portable applications is their ability to efficiently utilize the limited capacity of the battery powered voltage source. Typical applications include cellular telephones and personal digital assistants (PDAs), which might have a Lithium ion battery of 800 mA-Hr capacity or two AAA alkaline batteries as the voltage source. Users expect as much as three to four weeks of standby operation using these devices. Standby operation is when the cellular phone is powered on but not actively involved in a call. Industry estimates are that the integrated circuit is only performing useful work approximately 2% of the time while the phone is in standby mode.

Integrated circuit designers have long used Complementary MOS (CMOS) transistor logic to implement battery powered integrated circuits because the power consumed by the circuit was directly proportional to the switching activity of the circuit as defined in the following equation:

$$P_{total} = P_{leakage} + CV^2 F$$

Until recently, the high input impedance of CMOS devices kept the leakage component small enough that it could be ignored. The active component is determined by the capacitance (C), voltage (V) and frequency (F) of circuit operation. Designers have employed several techniques to reduce active power consumption including disabling the clocks during periods of inactivity, reducing the operating voltage and reducing capacitance using smaller process geometries. These steps are important but only addresses a portion of the power lost during standby.

Recent fabrication process advances have permitted circuits of increasingly finer geometries to be fabricated. While these advances have permitted more circuits to be built in a given silicon area, they have had the undesirable effect of increasing the leakage current due to direct tunneling effects caused by thinner gate oxides and narrower channels. Leakage currents have increased from <1 picoamp per micron of gate length in a 1.0 micron feature size process to as much as 1 nanoamp per micron in today's 0.13 micron processes. The increases in leakage current no longer permit the leakage component of the power equation to be ignored.

Removing the power supply from selected circuits during standby is a well known technique employed by board level designers for battery powered applications such as notebook computers. It has similarly been applied to integrated circuits but only to blocks outside of the central processing unit (CPU). A primary reason for not applying this technique to CPUs, has been the difficulty in being able to retain the current processor state information necessary to continue execution after coming out of the standby mode. Notebook computer designers have gotten around this limitation by saving the current processor state information to external storage mechanisms such as a hard disk drive. In such a case there is the overhead required in transferring the state to and from the external storage mechanism. Even if the battery powered device had a hard disk drive, and many don't, the time consuming state transfer would not meet the real time response requirements of the application.

Thus, there is a need for powering down a CPU for reduced standby power consumption while retaining the integrity of the operating state.

DESCRIPTION OF THE INVENTION

Power savings in a central processing unit (CPU) is achieved by selectively removing the power to certain elements of the CPU that are not critical for coming out of powerdown. Other components of the CPU that are critical for coming out of powerdown receive a reduced power supply voltage during powerdown. The result is a major savings in power during powerdown due to the reduction in leakage current. This is better understood by reference to the figures and the following description.

Figure 1:
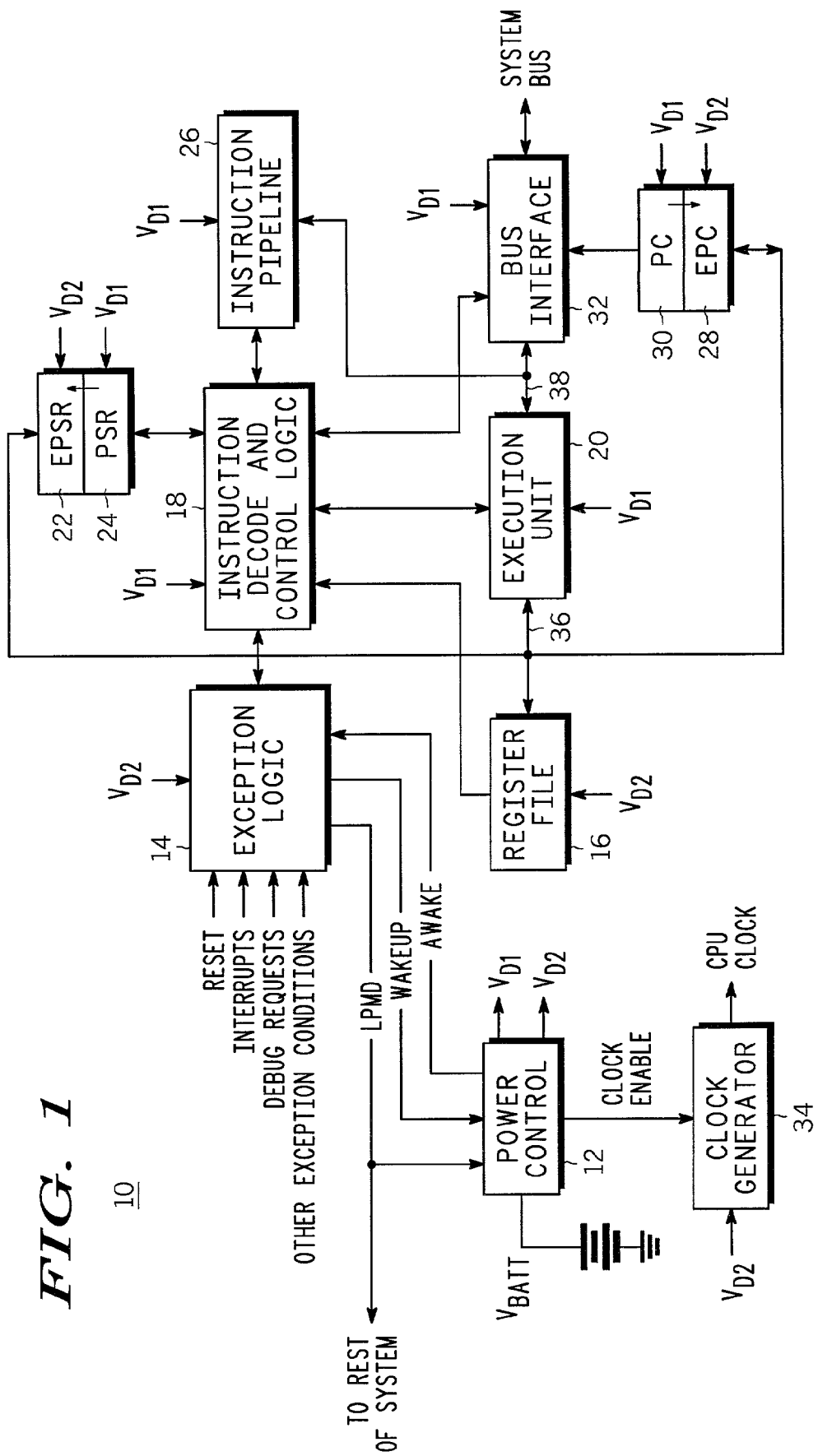
FIG. 1 is a block diagram of a central processing unit, clock generator, and power control according to an embodiment of the invention.

Shown in FIG. 1 is a CPU 10, a power control circuit 12 and a clock generator 34. CPU 10 comprises exception logic 14, a register file 16, instruction decode and control logic 18, an execution unit 20, an exception processor status register (EPSR) 22, a processor status register (PSR) 24, an instruction pipeline 26, an exception program counter (EPC) 28, a program counter (PC) 30, and a bus interface 32. Power control 12 supplies switchable power supplies VD1 and VD2 as outputs. Exception logic 14, register file 16, EPC 28 and EPSR 22, and clock generator 34 are powered by switchable power supply VD2. Execution unit 20, bus interface 32, instruction pipeline 26, PSR 24, and PC 30 are powered by switchable power supply VD1. Exception logic 14 supplies a low power mode signal (LPMD) to power control 12. Exception logic 14 provides a wakeup signal to power control 12. Power control 12 provides an awake signal to exception logic 14. Power control 12 provides a clock enable signal to clock generator 34. Clock generator 34 provides a CPU clock as an output. EPSR 22, PSR 24, PC 30, EPC 28, and register file 16 collectively contain current processor state information.

Exception logic 14 receives interrupts, debug requests, reset and other exception conditions. Exception logic 14 is coupled to instruction decode and control logic 18. Instruction and decode logic 18 is coupled to PSR 24, instruction pipeline 26, register file 16, and execution unit 20. Execution unit 20 is coupled to register file 16 by a data bus 36. Execution unit 20 is also coupled to EPSR 22 and EPC 28 by data bus 36. Execution unit 20 is also connected to PSR 24 and PC 30 by data bus 36 although that specific connection is not shown explicitly in FIG. 1 to avoid unduly complicating the figure. Execution unit 20 is coupled to bus interface 32 and instruction pipeline 26 by a data bus 38. Bus interface 32 is coupled to PC 30. Each element of CPU 10 receives the CPU clock from clock generator 34.

The arrangement of exception logic 14, register file 16, instruction decode and control logic 18, execution unit 20, EPSR 22, PSR 24, instruction pipeline 26, EPC 28, PC 30, and bus interface 32 is substantially that of CPUs well known in the industry. Exception logic 14 in particular, however, provides novel characteristics that result in CPU 10 being able to have an improved current leakage characteristic. CPU 10 performs conventional functions of executing instructions and exceptions. To enter into powerdown a stop instruction, which is a conventional instruction, is executed. The stop instruction is for taking the relevant integrated circuit into a low power mode.

Instruction decode and control logic 18 begins the execution of the stop instruction by decoding it and passing the necessary information to the execution unit 20 and exception logic 14. Exception logic 14, in response to receiving the request to enter low power mode, asserts the LPMD signal which is received by power control 12. Execution unit 20, as part of executing the stop instruction, loads EPC 28 and EPSR 22. In response to the LPMD signal, power control 12 switches the switchable power supply VD1 from VDD to a floating condition and switches switchable power supply VD2 from VDD to a lower voltage. VDD, as is commonly understood, is the positive power supply voltage for normal operation of the circuits shown in FIG. 1. In current MOS integrated circuit designs this is typically 1.5 to 1.8 volts. The low voltage of VD2 is an intermediate voltage set near the lower limit that the storage element circuits can retain data, typically about 0.9 volt. Power control 12 also de-asserts the clock enable signal to clock generator 34. Clock generator 34 responds by stopping the CPU clock. It is desirable that the CPU clock be terminated prior to switchable power supplies VD1 and VD2 being switched to the standby mode values of floating and the intermediate voltage, respectively, to avoid clock edges occurring during the power supply transition.

Thus, it is seen that the execution of the stop instruction results in the removal of power from PSR 24, instruction decode and control logic 18, execution unit 20, PC 30, bus interface 32, and instruction pipeline 26 that provides the benefit of eliminating leakage current by those circuit elements during powerdown. Receiving reduced power by VD2 are exception logic 14, register file 16, EPSR 22, and EPC 28. Exception logic 14 is necessary to have power in order to detect when power-up is to begin. Register file 16 contains the current state of the programmer's model registers. EPC 28 and EPSR 22 retain the information concerning PSR 24 and PC 30. EPSR 22 and EPC 28 are commonly used as shadow registers for the purpose of storing information from PC 30 and PSR 24 during exceptions and thus are not additional circuits required for this powerdown mode.

Figure 2:
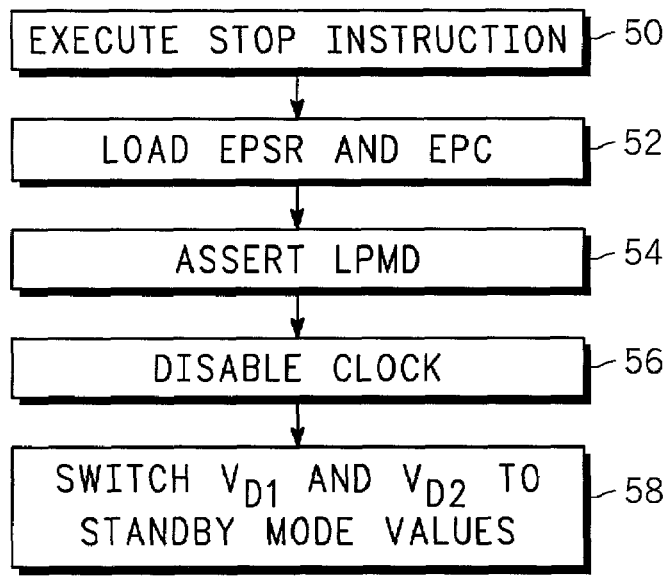
FIG. 2 is a flow diagram useful in understanding one operation of the circuit of FIG. 1.

This sequence of powerdown is shown in FIG. 2 as being triggered by executing the stop instruction, shown as step 50, followed by the load EPSR and EPC steps shown as step 52. This is followed by the assert LPMD signal step 54. The assertion of LPMD causes the disable clock step 56 and the assert LPMD signal also causes the switching of VD1 and VD2 to standby mode values in step 58.

Register file 16, because it has an interface with circuits which are powered down, such as execution unit 20 and instruction decode and control logic 18, incorporates an isolation circuit in these interfaces. Isolation interfaces are known in the industry and are necessary in a variety of situations including when one circuit is powered up and another adjoining one is not. Similarly, there is isolation circuitry between exception logic 14 and instruction decode and control logic 18. In CPU 10 there is isolation circuitry in all the cases where there is an interface between a circuit element receiving VD1 and a circuit element receiving VD2.

Execution unit 20 need not be powered during powerdown because it does not retain values that are important when returning to operation following an exception. Prior to the execution of the stop instruction all of the values generated by execution unit 20 would have been stored in register file 16. Thus, register file 16 has the information that is necessary for coming out of powerdown. CPU 10 comes out of powerdown only in response to an exception. Any time there is an exception, instruction pipeline 26 is flushed, and its contents must be reloaded as a result of the exception in normal operation. Thus, during powerdown there is no need to retain any contents of instruction pipeline 26 because they would be flushed anyway in response to the exception. Similarly, instruction decode and control logic 18 is re-initialized by an exception. Bus interface 32 need not be powered during powerdown because, during the execution of the stop instruction, all data to be provided by bus interface 32 has been transferred prior to the generation of the LPMD signal.

An exception is entered in order to come out of powerdown. Exception logic 14 receives one of interrupts, debug requests, or reset. The other exception conditions are not generated during powerdown. Exception logic 14 passes the exception to instruction decode and control logic 18. Exception logic 14 also asserts the wake up signal to power control 12. Power control 12 responds by ramping VD1 to VDD and VD2 to VDD. After VD1 and VD2 have reached VDD, the clock enable signal is asserted to clock generator 34 which then generates the CPU clock. Instruction decode and control logic 18 begins generating the necessary signals to begin normal operation in response to the exception. First PSR 24 and PC 30 are loaded. Bus interface 32 is enabled to begin fetching the instructions that are loaded into instruction pipeline 26. After instruction pipeline 26 has been loaded, execution unit 20 begins executing the instructions.

Thus, at power-up instruction decode and control logic 18 responds to exception logic 14 in a manner that causes a normal operation in response to an exception which includes requiring no information stored in instruction decode and control logic 18, execution unit 20, bus interface 32, instruction pipeline 26, PSR 24, or PC 30. Thus, powerdown effectively results in substantially reduced leakage current of the CPU while still retaining all the necessary information to power-up while coming out of powerdown. The register file 16 retains all of the programmer's model registers which the programmer will rely on when returning from the exception. The conventional components of a CPU are partitioned by known isolation techniques to achieve improved powerdown current by proper selection of elements which receive power during powerdown and those that don't.

Figure 3:
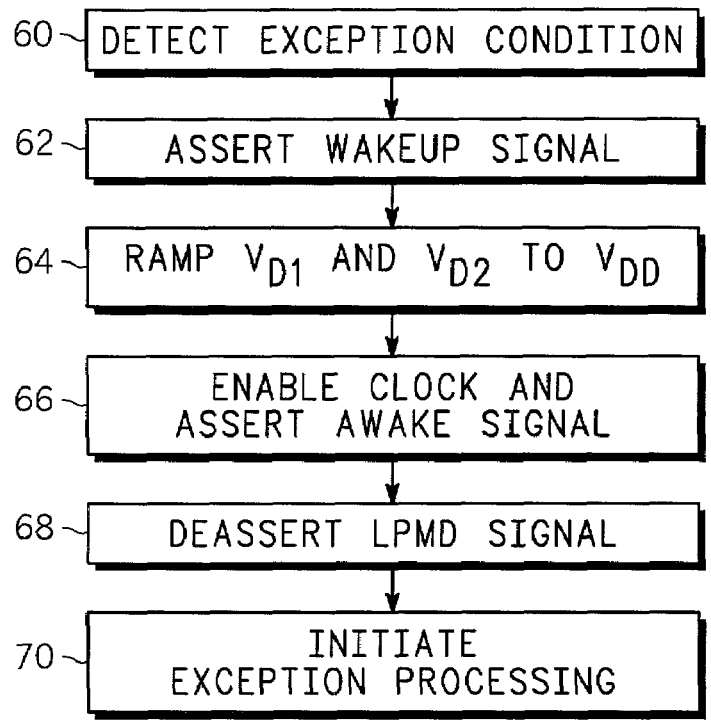
FIG. 3 is a flow diagram useful in describing another operation of the circuit of FIG. 1.

Shown in FIG. 3 is a flow diagram describing coming out of power down. The first step 60 is shown as detecting an exception condition. In this case this means detecting one of an interrupt, a debug request or a reset. The wakeup signal is asserted as shown in Step 62 in response to detecting the exception condition. Power control 12 responds to the wake up signal by ramping VD1 and VD2 to VDD as shown in Step 64. Also in response to the wakeup signal being asserted, the power control signal enables the clock generator and asserts the awake signal to exception logic 14 as shown in Step 66. The awake signal informs exception logic 14 that the circuitry of CPU 10 has been powered up fully and is ready to begin responding to the exception. Exception logic 14 then de-asserts the LPMD signal as shown in Step 68. This begins the initiation of the exception processing as shown in Step 70.

Thus, it is shown that certain portions of a CPU can be completely powered down and thus avoid the leakage current that occurs in those circuits. A relatively small percentage, approximately 10%, of the CPU needs to be powered. Because the bulk of the circuitry comprises execution unit 20, instruction decode and control logic 18 as well as instruction pipeline 26, which are un-powered, only 10 percent requires power. In the described embodiment even the 10 percent that is receiving power has lower power loss due to leakage currents because of the reduced standby voltage. Because these powered portions are not switching at high speed, they can be maintained at a relatively lower voltage that also reduces leakage current. Much of the benefit described by this power down technique would be available as well without reducing the power on those circuits that are powered. Thus, one option to retain much of the advantage would be simply to maintain exception logic 14 and register file 16 as well as clock generator 34 at VDD instead of switching to a lower voltage.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A data processing system on an integrated circuit, comprising:
    a central processing unit (CPU) for executing instructions, including a low power mode instruction used for entering a low power mode;
    wherein the CPU comprises an execution unit for executing instructions;
    a logic unit for asserting a low power mode signal in response to the CPU entering a low power mode instruction;
    a storage device for storing, prior to executing the low power mode instruction, a current state of a programmer's model; and
    a bus interface for coupling the CPU to a system bus;
    a clock generator for providing a clock signal to time various functions of the CPU;
    a power control unit, coupled to the logic unit, the power control unit receiving the low power mode signal, and in response, the power control unit for disabling the clock generator, maintaining a power supply voltage to the logic unit and the storage device, while removing the power supply voltage from the execution unit and the bus interface;
    wherein the central processing unit, the clock generator, and the power control unit are on the integrated circuit.

2. The data processing system of claim 1, wherein the storage device includes a processor status register and an exception processor status register, wherein during low power mode, the processor status register is powered down and the exception processor status register is for receiving the power supply voltage and storing the information relating to the current status of the CPU during the low power mode.

3. The data processing system of claim 1, wherein the storage device comprises:
    a program counter for storing a current program count value during normal operation of the CPU; and
    an exception program counter, coupled to the program counter, for storing the current program count value during the low power mode while the program counter is powered down.

4. The data processing system of claim 1, wherein the power control unit has a first output for providing a first power supply voltage to the execution unit, and a second output for providing a second power supply voltage to the logic unit and the storage device, wherein during the low power mode, the first power supply voltage is reduced to about zero volts and the second power supply voltage is maintained at a normal operating voltage.

5. The data processing system of claim 4, wherein the first power supply voltage is reduced to about zero volts and the second power supply voltage is reduced to an intermediate voltage level.

6. The data processing system of claim 4, further comprising:
    an instruction decode and control unit, coupled to the execution unit and to the first output of the power control unit for receiving the first power supply voltage; and
    an instruction pipeline unit, coupled to the instruction decode and control unit and to the first output of the power control unit for receiving the first power supply voltage.

7. The data processor of claim 1, wherein the logic unit will respond to an exception while the CPU is in the low power mode, and in response to receiving the exception, the exception logic unit providing a wakeup signal to the power control unit; and the power control unit for receiving the wakeup signal, and in response, the power control unit for restoring the power supply voltage to the execution unit, enabling the clock generator, and de-asserting the low power mode signal.

8. The data processing system of claim 7, wherein the storage device further comprises:
    a program counter for storing a current program count value during normal operation of the CPU; and
    an exception program counter, coupled to the program counter, for receiving and storing the current program count value during low power mode of the CPU while the program counter is powered down during low power mode.

9. The data processing system of claim 7, wherein the storage device further comprising:
    a processor status register for storing current status information during normal operation of the CPU; and
    an exception processor status register, coupled to the processor status register for receiving and storing the current status information during low power mode of the CPU while the processor status register is powered down during low power mode.

10. The data processing system of claim 7, wherein the power control unit provides an awake signal to the logic unit after the power supply voltage is successfully restored to the execution unit.

11. A method for entering a low power mode in a data processing system on an integrated circuit having a central processing unit (CPU) that has a bus interface coupled to a system bus and an execution unit, the method comprising the steps of:
    using a storage location within the CPU for maintaining a programmer's model of the CPU during a normal operation of the CPU including a time prior to the data processing system entering the low power mode;
    executing an instruction that triggers entering the low power mode;

removing power in response to entering the low power mode from and keeping power removed during the low power mode from:
the bus interface; and
the execution unit;
maintaining power during the low power mode to:
the storage location so that a state of the programmer's model in the storage location prior to entering the low power mode is retained in the storage location during the low power mode; and
the logic unit.

12. The method of claim 11, wherein the processor state information further includes processor status information, and a program count value.

13. The method of claim 12, wherein the step of maintaining the current processor status further comprises storing the current processor state in a first shadow register.

14. The method of claim 12, further comprising maintaining a current program count value in a second shadow register.

15. The method of claim 11, wherein the instruction is characterized as being an instruction for stopping operation of the CPU.

16. The method of claim 11, wherein the step of maintaining power is further characterized as applying power at a reduced voltage in response to entering the low power mode.

17. The method of claim 11, further comprising the steps of:
detecting an exception condition while the CPU is in the low power mode;
asserting a wake up signal in response to detecting the exception condition;
restoring the power supply voltage to the predetermined portions of the CPU;
enabling the clock generator;
de-asserting the low power mode signal; and
initiating processing of the exception.

18. The method of claim 17, further comprising the step of providing an awake signal to confirm that the power supply voltage is restored.

19. The method of claim 17, wherein the current processor state information includes processor status information and the method further comprises the step of:
restoring the current processor status information from the predetermined location to a processor status register following the processing of the exception.

20. A data processing system on an integrated circuit comprising:
a central processing unit (CPU) for processing instructions including a stop instruction, wherein the CPU comprises:
an execution unit for the executing instructions;
a storage device for storing, prior to executing the stop instruction, a current state of a programmer's model; and
a storage device for storing information relating to a current state of the CPU prior to an execution of the stop instruction, wherein the information comprises the current state of a programmer's model;
a logic unit for asserting a low power mode signal in response to the CPU processing the stop instruction; and
a bus interface for coupling the CPU to a system bus;
a clock generator for generating a clock signal to time various functions of the CPU; and
a power control means, coupled to the logic unit, for receiving the low power mode signal and in response to receiving the low power mode signal disables the clock generator and maintains a power supply voltage to the logic unit and the storage device while removing the power supply voltage from the execution unit and the bus interface.

* * * * *